UNITED STATES PATENT OFFICE.

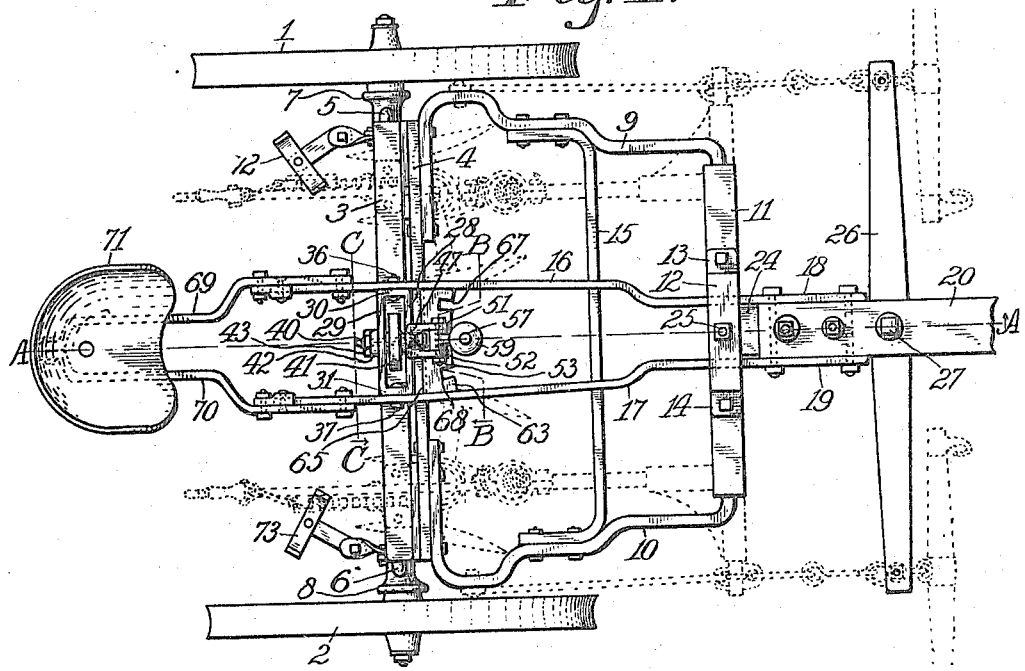
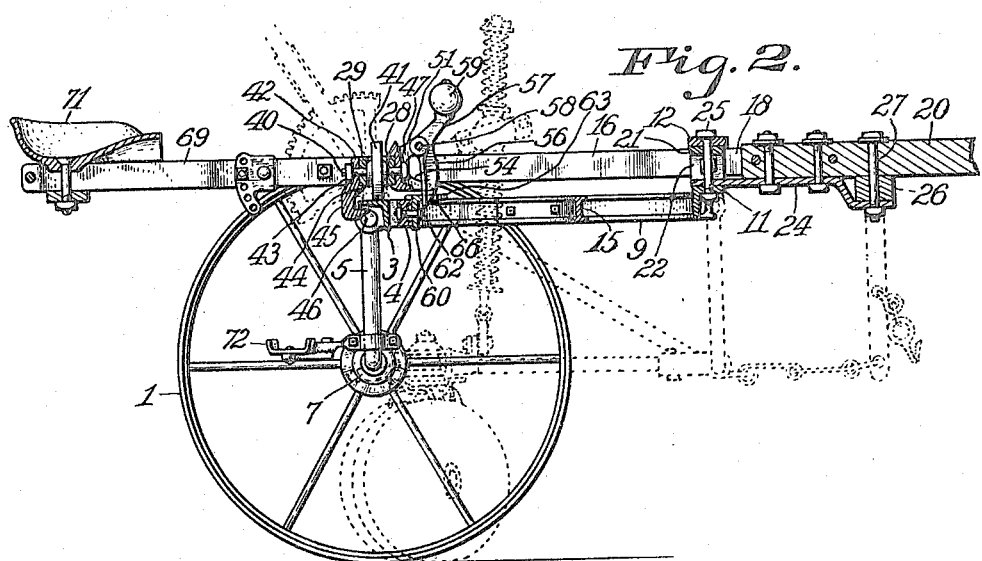

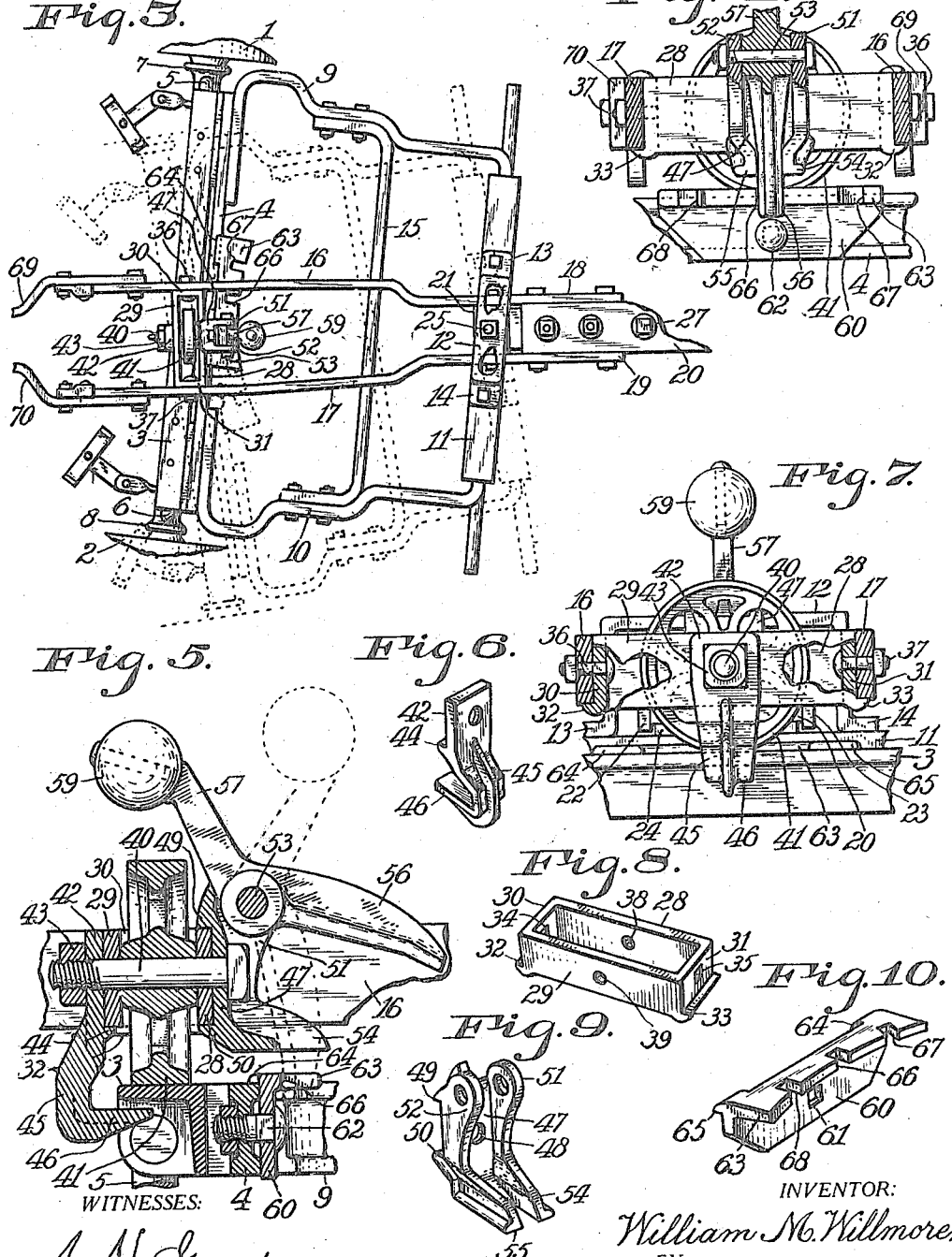

WILLIAM M. WILLMORE, OF VINCENNES, INDIANA, ASSIGNOR TO HARTMAN MANUFACTURING COMPANY, OF VINCENNES, INDIANA, A CORPORATION OF INDIANA.

ADJUSTABLE RIDING-CULTIVATOR FRAME.

1,208,434.                    Specification of Letters Patent.       Patented Dec. 12, 1916.

Application filed July 13, 1914.   Serial No. 850,594.

*To all whom it may concern:*

Be it known that I, WILLIAM M. WILLMORE, a citizen of the United States, residing at Vincennes, in the county of Knox and State of Indiana, have invented a new and useful Adjustable Riding-Cultivator Frame, of which the following is a specification, reference being had to the accompanying drawings and to the letters and figures of reference marked thereon.

This invention relates to machines or structures that are designed to be drawn by animals for drawing and guiding various implements or devices, especially in farming operations, the invention having reference more particularly to a riding cultivator frame having a guiding tongue or pole and provided with means whereby the principal portion of the frame may be adjusted or moved to different angles relatively to the tongue or pole, the frame being provided with means such as wheels for carrying it on the ground, the relative movability permitting the frame which guides the cultivating implements to swerve or deviate from the line of travel followed by the guiding tongue or pole.

An object of the invention is to provide a frame with improved and reliable adjustable means adapted to enable the operator to conveniently and easily change or vary the line of movement while the animals drawing the frame pursue a straight or regular course.

Another object is to provide an improved cultivator frame of such construction as to be very strong and enable the driver to readily and reliably control the operations of the cultivating implements so as to avoid plants which may be in crooked rows while the draft animals follow the general direction of the rows.

A further object of the invention is to provide an improved riding cultivator frame which shall be so constructed that the driver shall be enabled to prevent the machine and the cultivating implements guided thereby from creeping or tending to slip downward while working on hill-sides, which frame shall be simple, reliable and durable in use.

With the above-mentioned and other objects in view, the invention consists in an improved frame adapted to control cultivator implements and provided with carrying devices such as wheels, the frame having a guiding tongue or pole whereby animals may draw and guide the frame and being adjustably connected to the tongue so that the frame may be adjusted to change the direction of movement thereof from side to side for the purpose of readily and easily following crooked rows of plants or avoiding irregularly planted hills, the invention consisting further in improved means whereby the cultivator frame may be latched in different positions relatively to its guiding tongue or pole so as to arrange the angularity of the carrying axle relatively to the line of draft for the purpose of causing the carrying wheels on hill-sides to roll upward and thus counteract the effect of creeping or slipping downward.

The invention consists also further in the novel parts and in the combinations and arrangements of parts as hereinafter particularly described and further defined in the accompanying claims.

Referring to the drawings, Figure 1 is a top plan of a cultivator frame constructed substantially in accordance with the invention, two gangs of disk cultivators of well-known construction being shown by broken lines in connection therewith; Fig. 2 is a longitudinal central sectional view on the line A A in Fig. 1; Fig. 3 is a fragmentary top plan of the frame adjusted to one position, another position being indicated by broken lines; Fig. 4 is a fragmentary section on an enlarged scale approximately on the line B B in Fig. 1; Fig. 5 is a fragmentary section on an enlarged scale on the line A A; Fig. 6 is a perspective view of one of the parts of the invention; Fig. 7 is a fragmentary section on an enlarged scale approximately on the line C C in Fig. 1; Fig. 8 is a perspective view of a roller box comprising a part of the invention; Fig. 9 is a perspective view of one of the parts of the invention, and Fig. 10 is a perspective view of one of the latching devices comprised in the invention.

Similar reference characters in the different figures of the drawings indicate corresponding elements or features of construction herein referred to in detail.

A suitable riding cultivator to which the invention is advantageously applied comprises carrying wheels 1 and 2 which support a suitable arch or arched axle which may be variously constructed and preferably comprises a main or beam portion 3 composed of L-section bar steel or iron having a flat top to form a track and preferably having an I-section bar 4 secured to the forward side thereof, the main portion having downwardly extending members or leg portions 5 and 6 provided with stub axles 7 and 8 respectively which are mounted in the respective carrying wheels. Two frame members 9 and 10 are fixedly secured to the bar 4, so that they practically are parts of the bar and they extend forward and are secured fixedly to a pivot bar 11, the latter forming a portion of the main frame as does also the beam portion 3 of the axle. The pivot bar includes a plate 12 having feet 13 and 14 which are secured upon the bar 11 so as to provide an opening in which the guiding tongue or pole or the extension thereof is pivoted. Preferably a brace bar 15 is secured to the frame members 9 and 10.

Two frame bars 16 and 17 are provided which extend across the main portion of the axle and are suitably spread apart, the bars having forward portions 18 and 19 that are set in each toward the other and extend through the opening provided in the pivot bar, a wooden tongue or pole 20 being fixedly secured between the bar portions 18 and 19, so that the bars 16 and 17 practically form an extension of the tongue and provided with a cross-bar 21 that extends between the portions 18 and 19 and has down-turned end portions 22 and 23 which are fixedly secured to the inner sides of the bar portions 18 and 19 respectively. A strap 24 is fixedly secured to the under side of the tongue 20 and extends rearward under the cross-bar 21, a pivot 25 being inserted through the plate portion 12, the cross-bar 21, the strap 24, and the pivot bar 11 so as to be in vertical arrangement and enable the tongue to swing relatively to the main frame. The forward portion of the strap 24 is offset downward and an equalizer or doubletree 26 is arranged between it and the tongue 20, and connected thereto by means of a pivot-bolt 27. It will be understood that swingletrees may be variously connected to or suspended from the equalizer or doubletree 26 for directly pulling the gangs of cultivators or such implements as may be required for use in connection with the frame.

A roller box is provided which comprises two main bars 28 and 29 to which two end bars 30 and 31 are fixedly connected, the box being placed between the bars 16 and 17 above the axle beam, and preferably the end portions 30 and 31 are provided with guide lugs 32 and 33 that extend under the bars respectively. The end bars 30 and 31 are provided with bolt holes 24 and 35 to receive bolts 36 and 37 whereby the box is rigidly secured to the bars 16 and 17. The main bars of the box have axle bearing holes 38 and 39 therein which receive an axle 40 on which a roller 41 is rotatably mounted and is supported so as to roll upon the main or beam portion 3 of the axle or main frame. A shank plate 42 is provided which is placed against the rear side of the bar 29 of the roller box and secured thereto by means of a nut 43 screwed onto the axle 40, the plate having a projection 44 that extends under the bar 29 for preventing rotation of the plate on the axle, an arm 45 extending downward from the plate and having a finger 46 thereon which extends under the axle or frame portion 3 so as to prevent the separation of the tongue or its extension from the main frame, particularly in case it is desired to lift the carrying wheels from the ground by means of the tongue extension.

In order to advantageously provide a suitable latch whereby to adjustably secure or lock the main frame to the tongue extension, a separate bracket is provided which comprises a base plate 47 having an aperture 48 therein which receives the axle 40 whereby the plate is secured to the forward side of the bar 28 of the roller box, the axle constituting a bolt, and the plate has projections 49 and 50 thereon which engage the top and bottom respectively of the box and prevent turning of the plate which is provided with ears 51 and 52 in which a pivot 53 is mounted, the lower portion of the plate 47 having guide fingers 54 and 55 thereon which project forward. A gravity latch is provided which comprises a latch arm 56 that is mounted on the pivot 53 and normally extends downward between and beyond the fingers 54 and 55, an operating and controlling arm 57 being formed integrally with the arm 56 and having a weight 59 on its end, the arms 56 and 57 being on obtuse angles so that normally the arm 57 leans forward of the vertical plane of the pivot and retains the arm 56 in normal position. A catch-bar or quadrant is provided and comprises a base plate 60 having an aperture 61 therein which receives a bolt 62 whereby the plate is secured to the bar 4 of the frame or axle, a flat bar 63 extending forward from the plate, projections 64 and 65 extending rearward upon the bar 4 for preventing the movement of the plate 60 about the axis of the bolt 62. The forward side of the bar 63 is curved concentrically to the pivot 25 and it has a suitable number of notches or recesses 66, 67 and 68 therein adapted to receive the arm 56 of the latch whereby to adjustably lock the tongue or its extension to the main frame or axle thereof.

The tongue extension is provided with seat bars 69 and 70 which preferably are formed separately and suitably secured to the bars 16 and 17 and support a seat 71 for the driver and operator of the cultivator. The members 5 and 6 of the axle are provided with foot-rests 72 and 73 respectively on which the driver may place his feet and whereby he is enabled to pivotally move the tongue relatively to the main frame when the latch bar is withdrawn from the quadrant or catch-bar.

It should be understood that the details of construction of the invention may be variously modified, for instance various forms of roller bearings may be provided between the tongue extension and the main frame or its axle and the coöperating latching or locking devices may be variously constructed and arranged as may be preferred, within the spirit and scope of the appended claims. Various types of cultivator gangs, some having disk cultivators, others having the shovel type of cultivator, being well known it is obvious that any one of the different types desired may be connected to and controlled by the sulky or carriage having the frame adjustable relatively to the guiding tongue.

In practical use the main frame is usually adjusted so that the axle is at right angles to the guiding tongue or pole and therefore the carrying wheels follow the line of travel of the animals that may be hitched to the vehicle in well-known manner, and in case the driver finds it necessary to prevent the cultivating implements from striking or working too closely to some of the plants or hills he draws the arm 57 rearward toward him and thereby releases the arm 56 from the notch 66, and the latch bar may thus remain as in Fig. 5, the arm 57 extending rearward and resting against the upper end of the base plate 47 so that the driver is permitted to shift the tongue pivotally by using his feet on the foot-rests 72 and 73. When working on a hill-side the tendency of the carrying wheels and also the cultivator disks is to creep downward on the slope, due to gravitation, and in such case the driver changes the angle of the frame and the axle so as to direct the carrying wheels upward on the hill-side to greater or less extent as may be required, so as to compensate for the slipping or creeping and thus keep the wheels from creeping down onto the rows of plants.

Having thus described the invention, what is claimed as new is—

1. In a cultivator frame, the combination of an axle, a frame member secured to the axle, two frame bars connected together and pivotally connected with the frame member forward of the axle and extending over the axle, a concave notched catch-bar having a base that is secured to the forward side of the axle, a bracket arranged above the catch-bar and connected with the two frame bars, and a latch bar pivoted to the bracket to engage the catch-bar and having an upwardly-extending weighted overbalancing-arm.

2. In an adjustable riding cultivator, the combination of an arched axle, a track secured upon the crown of the arched axle, a frame secured to the axle, two frame bars pivoted to the frame forward of the axle and extending over and beyond the axle, a roller box arranged between and secured to the frame bars, a roller mounted in the roller box and supported upon the track, and a guide secured to the rearward side of the roller box and extending under the track.

3. In a cultivator frame, the combination of an axle, a frame secured to the axle, two frame bars connected together and pivotally connected with the frame forward of the axle, the bars extending over and beyond the axle, a box arranged between and secured to the two frame bars, a concave notched catch-bar secured to the forward side of the axle, a bracket secured to the forward side of said box and having two guides thereon that extend above the catch-bar, and a latch bar pivoted to said bracket and normally extending between said guides and into engagement with said catch-bar.

4. In a cultivator frame, the combination of a main axle portion having a flat top, a frame bar secured to the forward side of the axle portion, two frame members secured to said bar, a pivot bar secured to said members, two frame bars extending across the flat top of said axle portion and across said pivot bar, a cross-bar secured to said frame bars and pivoted to said pivot bar, a concave notched catch-bar secured to said frame bar, a roller box arranged between and secured to said extension bars, a bracket secured to said box, a roller mounted in said box and supported upon the flat top of said axle portion, and a latch bar pivoted to said bracket to coöperate with said catch-bar.

5. In an adjustable cultivator frame, the combination with a flat main axle portion, a frame secured to the axle portion, and two frame bars connected together and pivotally connected with the frame, the bars extending over the axle portion; of a roller box comprising two main bars and two end bars connected together, the box being arranged between the two frame bars with the end bars thereof in contact with and secured to the frame bars respectively, said end bars having each a lug extending under the adjacent frame bar; an axle secured to the main bars of the box, and a roller mounted on the axle between the main bars of the box and supported upon the flat main axle portion.

6. In an adjustable cultivator frame, the combination with a main axle portion, a frame secured to the axle portion, and two frame bars connected together and pivotally connected with the frame, the bars extending over the axle portion and being movably supported thereon; of a box arranged between and secured to the two frame bars, a bracket comprising a base that is secured to the box and provided with upwardly-extending ears having a pivot, the lower portion of the base having guide fingers thereon; a latch comprising a latch arm mounted on the pivot and extending downward between and beyond the guide fingers, a controlling arm fixed on the latch arm and extending upwardly at an inclination to the vertical, and a weight fixed on the top of the controlling arm; and a quadrant fixedly mounted on the main axle portion and having notches to receive said latch arm.

In testimony whereof, I affix my signature in presence of two witnesses.

WILLIAM M. WILLMORE.

Witnesses:
  MAUDE ELDER,
  A. M. WILLOUGHBY.

Copies of this patent may be obtained for five cents each, by addressing the "Commissioner of Patents, Washington, D. C."